United States Patent
Sandberg et al.

(10) Patent No.: US 9,723,619 B2
(45) Date of Patent: Aug. 1, 2017

(54) COORDINATED MULTIPOINT TRANSMISSION AND RECEPTION (COMP) IN A WIRELESS TELECOMMUNICATIONS NETWORK

(71) Applicant: Telefonaktiebolaget L M Ericsson (publ), Stockholm (SE)

(72) Inventors: Sara Sandberg, Luleå (SE); Rodrigo Lopes Batista, Fortaleza (BR); Arne Simonsson, Gammelstad (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 441 days.

(21) Appl. No.: 13/817,490

(22) PCT Filed: Dec. 7, 2012

(86) PCT No.: PCT/SE2012/051355
§ 371 (c)(1),
(2) Date: Feb. 18, 2013

(87) PCT Pub. No.: WO2014/088483
PCT Pub. Date: Jun. 12, 2014

(65) Prior Publication Data
US 2014/0161054 A1    Jun. 12, 2014

(51) Int. Cl.
*H04L 5/00*    (2006.01)
*H04W 72/12*    (2009.01)
(Continued)

(52) U.S. Cl.
CPC .......... *H04W 72/121* (2013.01); *H04B 7/024* (2013.01); *H04B 7/0452* (2013.01); *H04L 5/0035* (2013.01); *H04W 72/1226* (2013.01)

(58) Field of Classification Search
CPC .... H04B 7/024; H04B 7/0408; H04B 7/0452; H04B 7/0469; H04B 7/0617; H04B 7/086;
(Continued)

(56) References Cited

U.S. PATENT DOCUMENTS

| | | | |
|---|---|---|---|
| 8,594,688 B2* | 11/2013 | Barbieri | H04B 7/024 370/312 |
| 2008/0165883 A1* | 7/2008 | Jiang et al. | 375/267 |

(Continued)

FOREIGN PATENT DOCUMENTS

WO    2007036073 A1    4/2007

OTHER PUBLICATIONS

Lee et al., "Coordinated Multipoint Transmission and Reception in LTE-Advanced: Deployment Scenarios and Operational Challenges", Feb. 2012, IEEE, IEEE Communications Magazine—Feb. 2012, pp. all.*

(Continued)

*Primary Examiner* — Jeffrey M Rutkowski
*Assistant Examiner* — Shah Rahman
(74) *Attorney, Agent, or Firm* — Murphy, Bilak & Homiller, PLLC

(57) ABSTRACT

A method in a first network node (110) for coordinating data transmissions between wireless devices (121, 122) and two or more antennas associated with at least one second network node (210, 310) in a wireless communication network (100) is provided. The wireless devices (121, 122) are served by the at least one second network node (210, 310) and the at least one second network node (210, 310) is configured to perform coordinated data transmission or reception. First, the first network node (110) identifies two or more groups of wireless devices based on mutual spatial correlation between the wireless devices (121, 122). Then, the first network node
(Continued)

(110) selects a subset of wireless devices from two or more of the identified groups of wireless devices based on a criterion that relates to a data rate of each of the wireless devices. The first network node (110) then schedules wireless devices from the selected subset of wireless devices for the coordinated data transmission or reception of the at least second and third network node (210, 310). The first network node (110) then coordinates the data transmission or reception between the two or more antennas comprised in the at least one second network node (210, 310) and the scheduled wireless devices.

A first network node and a computer program are also provided.

19 Claims, 8 Drawing Sheets

(51) Int. Cl.
*H04B 7/024* (2017.01)
*H04B 7/0452* (2017.01)

(58) Field of Classification Search
CPC ......... H04B 7/10; H04L 41/12; H04L 41/147; H04L 47/2491; H04L 67/2823; H04L 67/2828; H04L 5/0035; H04W 12/04; H04W 36/0022; H04W 36/0033; H04W 36/0038; H04W 36/14; H04W 72/121; H04W 72/1226; H04W 76/041
USPC ............. 455/550.1, 67.11; 709/249; 370/329
See application file for complete search history.

(56) References Cited

U.S. PATENT DOCUMENTS

| | | | |
|---|---|---|---|
| 2010/0265842 A1* | 10/2010 | Khandekar | H04W 72/0433 370/252 |
| 2011/0032839 A1* | 2/2011 | Chen et al. | 370/252 |
| 2011/0039547 A1* | 2/2011 | van Rensburg et al. | 455/423 |
| 2012/0108246 A1* | 5/2012 | Monogioudis | 455/446 |
| 2012/0165066 A1* | 6/2012 | Xiao | H04L 5/0037 455/525 |
| 2012/0202431 A1* | 8/2012 | Hawryluck et al. | 455/63.4 |
| 2012/0218962 A1* | 8/2012 | Kishiyama et al. | 370/329 |
| 2012/0230274 A1* | 9/2012 | Xiao et al. | 370/329 |
| 2013/0114656 A1* | 5/2013 | Sayana | H04B 7/024 375/219 |
| 2013/0153298 A1* | 6/2013 | Pietraski | E21B 7/04 175/45 |
| 2013/0267239 A1* | 10/2013 | Stancanelli et al. | 455/452.1 |
| 2014/0348011 A1* | 11/2014 | Zirwas | H04L 1/0025 370/252 |

OTHER PUBLICATIONS

Batista, R. L. et al., "Performance Evaluation for Resource Allocation Algorithms in CoMP Systems", 2010 IEEE 72nd Vehicular Technology Conference Fall (VTC 2010—Fall). Sep. 6-9, 2010. pp. 1-5. Ottawa, Ontario, Canada.

Batista, R. L. et al., "SINR Balancing Combined with SDMA Grouping in CoMP Systems", 2011 IEEE Vehicular Technology Conference (VTC Fall). Sep. 5-8, 2011. pp. 1-5. San Francisco, California, US.

Zhang, et al.,"An Efficient Resource-Allocation Scheme for Spatial Multiuser Access in MIMO/OFDM Systems," IEEE Transactions on Communications. Jan. 2005. pp. 107-116. vol. 53, No. 1.

Da, B. et al., "Dynamic Subcarrier Sharing Algorithms for Uplink OFDMA Resource Allocation," IEEE. 2007 6th International Conference on Information, Communications & Signal Processing. Dec. 10-13, 2007. pp. 1-5.

Ahn, et al. "An Efficient Resource-Allocation Scheme Using Subcarrier Sharing in MIMO/OFDM Multi-Cell Environment," IEEE. 2008 14th Asia-Pacific Conference on Communications (APCC). Oct. 14-16, 2008. pp. 1-5.

Liu, et al., "Proportional Fair Scheduling for Multi-Cell Multi-User MIMO Systems," Information Sciences and Systems (CISS). 2010 44th Annual Conference, IEEE. Mar. 17, 2010. pp. 1-6.

* cited by examiner

COORDINATED MULTIPOINT TRANSMISSION AND RECEPTION (COMP) IN A WIRELESS TELECOMMUNICATIONS NETWORK

TECHNICAL FIELD

Embodiments herein relate to coordinated multipoint transmission and reception (CoMP) in a wireless telecommunications network. In particular, embodiments herein relate to performing coordinated data transmission and reception in a wireless communications network.

BACKGROUND

In wireless communication networks, a way to increase both coverage and capacity is to use coordination for signal transmission and reception between the nodes in the network and wireless devices located in the coordinating coverage areas of the network nodes. This is generally referred to as Coordinated Multi-Point, CoMP, transmission and reception. This coordination may be used in downlink communication for scheduling and data transmission using, for example, beam forming or joint coherent processing and transmission, or in uplink communication, where a multitude of antennas are used to suppress and cancel interference and increase the signal-to-noise ratio, SNR.

In downlink communication, a CoMP system may also be seen as geographically distributed multiple transmission points over the system's coverage area which perform cooperative transmission. By allowing this coordination, coordinated transmission and reception strategies among network nodes, such as, e.g. adjacent Evolved NodeBs, eNodeBs, may be applied in order to coordinate the resources usage and manage interference.

One example of a CoMP scenario is shown in FIG. 1-2.

FIG. 1 depicts a communications network 100 comprising a number of network nodes 101, 102, 103. The network nodes 101, 102, 103 are configured to provide access to the communications network 100 over a radio link to wireless devices in their corresponding cells. The network nodes 101, 102, 103 may be connected and configured to communicate with each other over, e.g. an X2 connection 104.

FIG. 2 depicts a part of the wireless communications network 100 comprising the cells 201, 202, 203, 204, 205, 206, 207, 208, 209 of the network nodes 101, 102, 103. In FIG. 2, the cells 203, 206, 209 are comprised in a CoMP cell of cooperating cells of the access network nodes 101, 102, 103. The CoMP cell is shown as marked with vertical lines in FIG. 2. A CoMP cell may be described as a collection of cooperating cells of one or more network nodes in which signals of multiple antennas may be combined to form a joint coordinated transmission or reception of data to or from wireless devices served in the cooperating cells. In FIG. 2, this means that, within the cells 203, 206, 209, i.e. the CoMP cell, the network nodes 101, 102, 103 may perform coordinated data transmission or reception to or from wireless devices served by the cells 203, 206, 209.

In a CoMP cell, Channel State Information, CSI, is estimated by the wireless devices and reported to the network node via feedback channels. The network node may then use the CSI and the distributed antenna array of the CoMP system for applying different Radio Resource Allocation, RRA, strategies. A RRA strategy may comprise spatial precoding and multi-user multi-cell scheduling in the joint data transmissions to the wireless devices. This may be performed in order to mitigate intra-cell, as well as, inter-cell interference and efficiently separate streams intended to different wireless devices.

While the spatial multiplexing of signals intended to different wireless devices is done using spatial precoding, spectral efficiency gains are often obtained by transmitting to spatially compatible wireless devices, i.e. a given group of wireless devices whose channels are favourable for spatial separation, using multi-user multi-cell scheduling.

It may be shown that there are significant joint transmission gains that may be obtained with using multi-user multi-cell scheduling within a CoMP scenario, such as, e.g. an adaptive Space Division Multiple Access, SDMA, scheduling, as compared to single-user single-cell scheduling.

However, it may be difficult to select which wireless devices the multi-user multi-cell scheduling algorithm should be applied to, i.e. the wireless devices that may efficiently share the same resources in space; or, in other words, selecting groups of wireless devices with orthogonal channels that may be co-scheduled for the CoMP transmission.

For example, in some CoMP scenarios, the scheduling algorithm may be applied to all wireless devices in a system's coverage area which perform cooperative transmissions. By performing this type of wide search, the scheduling algorithm may find the best wireless devices to co-schedule on the same non-orthogonal spatial resource. However, this approach results in a high degree of scheduling complexity, since it requires very extensive pre-coder calculations, e.g. the pre-coder vectors and/or effective channel gains for each candidate wireless device have to be repeatedly calculated. Thus, performing a wide search in a large CoMP scenario within the required time frame may even be impossible if there are many wireless devices to be scheduled or several candidate wireless devices in the CoMP scenario. The required time frame may here be for every Transmission Time Interval (TTI). One TTI may here correspond to 1 ms as defined in the LTE standard.

In a large CoMP scenario, instead of having joint data transmissions being performed within the entire large CoMP scenario, the joint data transmissions may be performed in different clusters of cells within the large CoMP scenario. This may be performed in order to e.g. reduce the scheduling complexity in the large CoMP scenario. The clusters of cells may be described as subsets of cells that are mutually exclusive, i.e. each subset of cells comprises cells that do not occur in any other subset of cells.

These approaches may make use of Reference Signal Received Power (RSRP) measurements of all wireless devices for all the cells belonging to its large CoMP scenario to dynamically create the clusters of cells within the entire large CoMP scenario, which may be adapted to current channel and load conditions. Thus, the wireless devices in each cluster of cells may be jointly scheduled by a scheduling algorithm, e.g. an SDMA algorithm. This may be useful when the backhaul or other hardware limitations makes joint coordinated transmission or reception with all antennas in the entire large CoMP scenario unfeasible.

This means that coherent CoMP transmissions will be performed in smaller areas with fewer involved cells and antennas than in the large CoMP scenario. Also, the scheduling algorithms applied to these smaller areas will have a lower scheduling complexity than a scheduling algorithm applied in the large CoMP scenario since these areas comprises fewer wireless devices.

However, there is a significant loss of the system spectral efficiency as the number of clusters of cells is increased when comparing to the no-clustering scenario, i.e. the large CoMP scenario. This degradation on the system performance is due to the generation of more interference for each additional cluster of cells following the subsequently increased cluster-edge length where coherent CoMP may not be utilized; this, besides also limiting the coordination degree.

SUMMARY

It is an object of embodiments herein to improve the system performance in a wireless communications network performing coordinated data transmissions or reception.

According to a first aspect of embodiments herein, the object is achieved by a method in a first network node for coordinating data transmissions between wireless devices and two or more antennas associated with at least one second network node in a wireless communication network. The wireless devices are served by the at least one second network node and the at least one second network node is configured to perform coordinated data transmission or reception. First, the first network node identifies two or more groups of wireless devices based on mutual spatial correlation between the wireless devices. Then, the first network node selects a subset of wireless devices from two or more of the identified groups of wireless devices based on a criterion that relates to a data rate of each of the wireless devices. The first network node then schedules wireless devices from the selected subset of wireless devices for the coordinated data transmission or reception. The first network node then coordinates the data transmission or reception between the two or more antennas associated with at least one second network node and the scheduled wireless devices.

According to a second aspect of embodiments herein, the object is achieved by a first network node for coordinating data transmissions between wireless devices and two or more antennas associated with at least one second network node in a wireless communication network. The wireless devices are served by the at least one second network node and which at least one second network node is configured to perform coordinated data transmission or reception. The first network node comprises an identification unit configured to identify two or more groups of wireless devices based on mutual spatial correlation between the wireless devices, a selection unit configured to select a subset of wireless devices from two or more of the identified groups of wireless devices based on a criterion that relates to a data rate of each of the wireless devices, a scheduling unit configured to schedule wireless devices from the selected subset of wireless devices for the coordinated data transmission or reception, and a coordinating unit configured to coordinate the data transmission and reception between the two or more antennas associated with at least one second network node and the scheduled wireless devices.

According to a third aspect of embodiments herein, the object is achieved by a computer program for use in a first network node for coordinating data transmissions between wireless devices and two or more antennas associated with at least one second network node in a wireless communication network. The wireless devices are served by the at least one second network node and the at least one second network node are configured to perform coordinated data transmission or reception. The computer program comprises computer readable code means which when run in the first network node causes the first network node to identify two or more groups of wireless devices based on mutual spatial correlation between the wireless devices. It further causes the first network node to select a subset of wireless devices from two or more of the identified groups of wireless devices based on a criterion that relates to a data rate of each of the wireless devices, schedule wireless devices from the selected subset of wireless devices for the coordinated data transmission or reception, and coordinate the data transmission or reception between the two or more antennas associated with at least one second network node and the scheduled wireless devices.

By selecting a subset of wireless devices, from groups of wireless devices with low mutual spatial correlation, based on a criterion that relates to a data rate of each of the wireless devices, wireless devices which are unlikely to be scheduled in the coordinated data transmission or reception are excluded from the scheduling. This may be performed because the likelihood of a wireless device being scheduled in a coordinated data transmission or reception may to a large extent be estimated based on one or more data rates of the wireless device.

Thus, since the scheduling complexity of the coordinated data transmission or reception increases with the number of wireless devices, this selection of a subset of wireless devices to be scheduled in the coordinated data transmission or reception, which also may be referred to herein as "pruning" or "pre-scheduling" of the wireless devices to be scheduled in the coordinated data transmission or reception, reduces the scheduling complexity.

Further, since the scheduling complexity is reduced due to smaller subsets of wireless devices being used in the scheduling of the coordinated data transmission or reception, the joint transmission gains found in large CoMP scenarios are substantially achieved.

This improves the radio network capacity and user bitrate for a given scheduling processing capability for performing the coordinated data transmission or reception.

Hence, the system performance in a wireless communications network performing coordinated data transmissions and reception is improved.

BRIEF DESCRIPTION OF THE DRAWINGS

Features and advantages of the embodiments will become readily apparent to those skilled in the art by the following detailed description of exemplary embodiments thereof with reference to the accompanying drawings, wherein.

DETAILED DESCRIPTION

Figure 1:
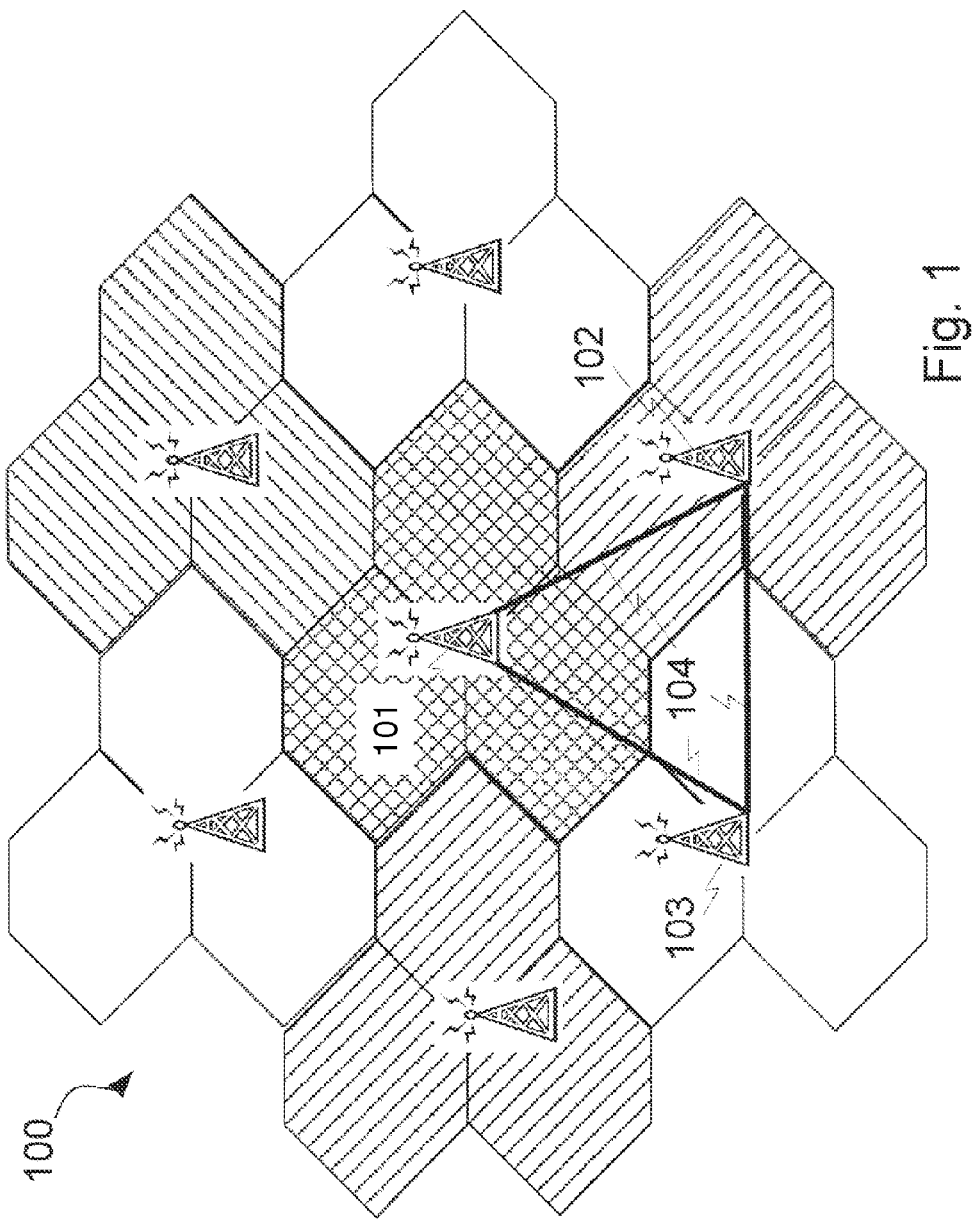
FIG. 1 is a schematic illustration of network nodes in a communications network.
Figure 2:
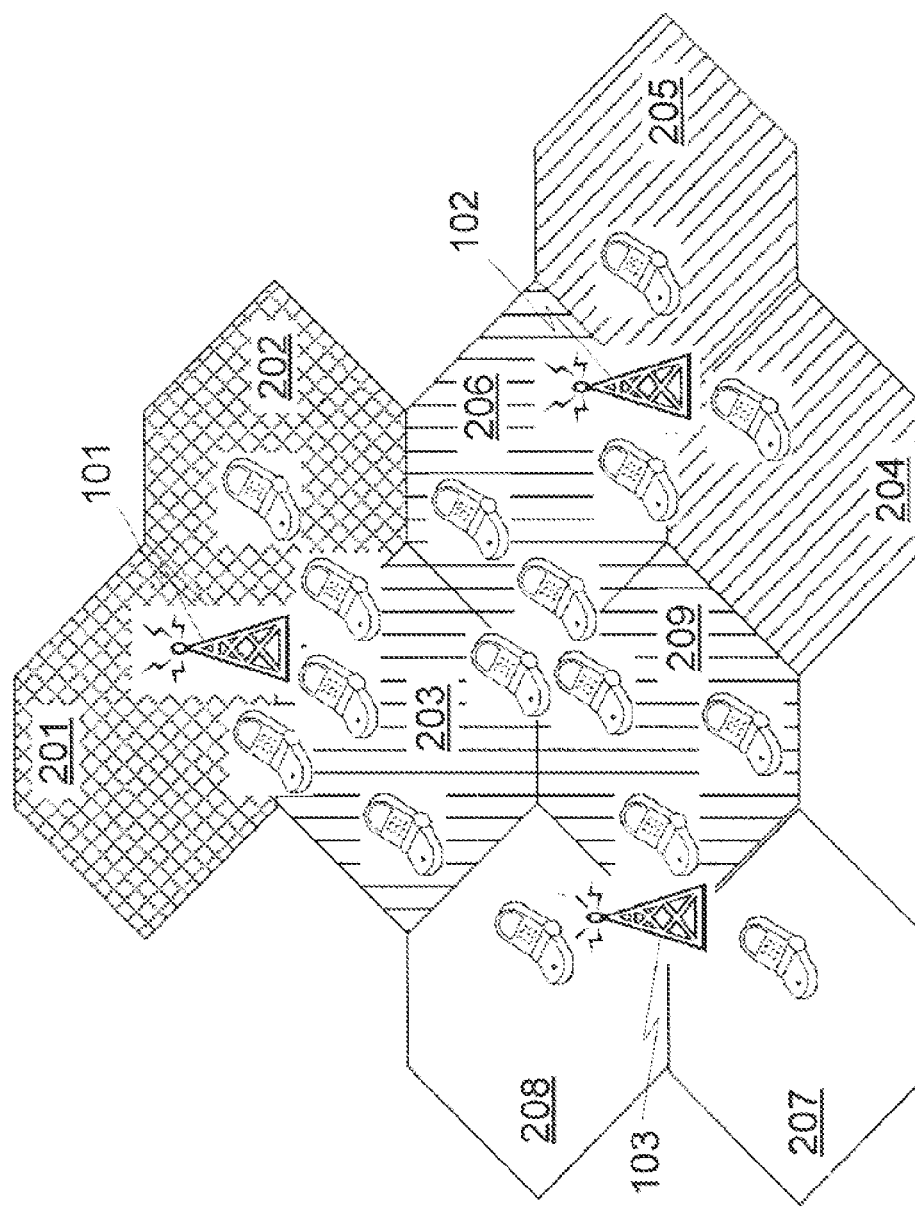
FIG. 2 is a schematic illustration of a CoMP scenario for network nodes in the communications network in FIG. 1.

The figures are schematic and simplified for clarity, and they merely show details which are essential to the understanding of the embodiments presented herein, while other details have been left out. Throughout, the same reference numerals are used for identical or corresponding parts or steps.

Figure 3:
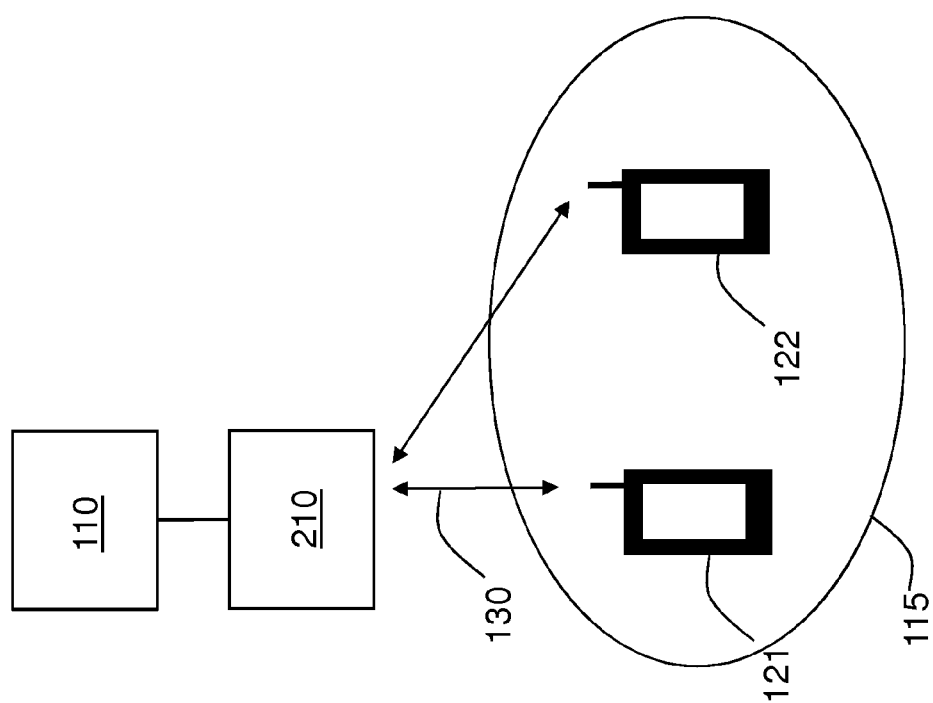

FIG. 3 depicts a communications network 100 in which embodiments herein may be implemented. In some embodiments the communications network 100 may be any wireless communication network capable of supporting coordinated multipoint (CoMP) data transmission or reception. Some examples of such communication networks 100 are LTE (e.g. LTE FDD, LTE TDD, LTE HD-FDD), LTE-Advanced (LTE-A), WCDMA, UTRAN, GSM network, GERAN network, enhanced data rate for GSM evolution (EDGE) network, network comprising of any combination of RATs such as e.g. Multi-Standard Radio (MSR) base stations, multi-RAT base stations etc., any 3GPP cellular network, Wimax, or other cellular network or systems. An implementation wherein the communications network 100 is a Wi-Fi network may also be envisioned.

As shown in FIG. 3, in some embodiments, the communication system 100 may comprise a first network node 110 connected to a second network node 210.

In these embodiments, the first network node 110 may e.g. be a centralized eNodeB, a Mobility Management Entity (MME) node, an Operation and Management (O&M) node, Operation and Support System (OSS) node, an RRM server, etc.

The second network node 210 may be referred to as an access network node, radio network node or base station. The second network node 210 may serve one or more cells. In FIG. 3, a cell 115 denotes a CoMP cell in which the at least one second network node 210 is configured to provide coordinated multipoint (CoMP) data transmissions or reception to or from wireless devices 121, 122. This coordinated data transmission or reception may be performed from two or more antennas associated with the second network node 210. This means that the second network node 210 may comprise or be communicatively connected to the two or more antennas.

The second network node 210 may e.g. be an eNB, an eNodeB, or a Home Node B, a Home eNode B, a femto Base Station (BS), a pico BS, a Remote Radio Unit (RRU), a Radio over Fiber node, or any other network unit capable to serve a wireless device, e.g. a machine type communication device, which is located in the cell 115 in the communications network 100.

Figure 4:
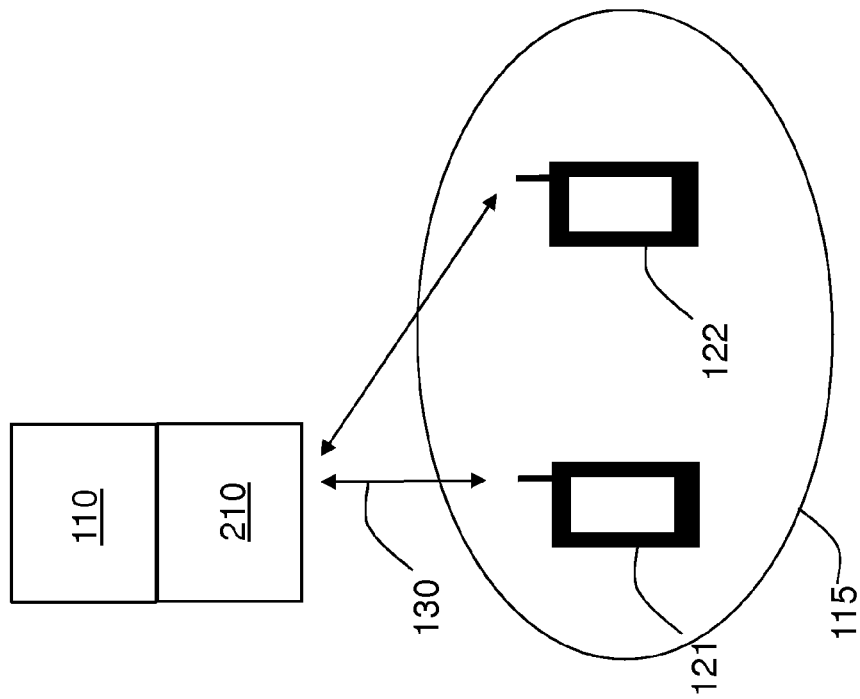
FIGS. 3-6 are schematic block diagrams illustrating embodiments in a communications network.

As shown in FIG. 4, in some embodiments, the first network node 110 may also be co-located with, or implemented in, the second network node 210. Thus, the first network node 110 and the second network node 210 may e.g. be a single network unit, such as, a single eNB or eNodeB.

Figure 5:
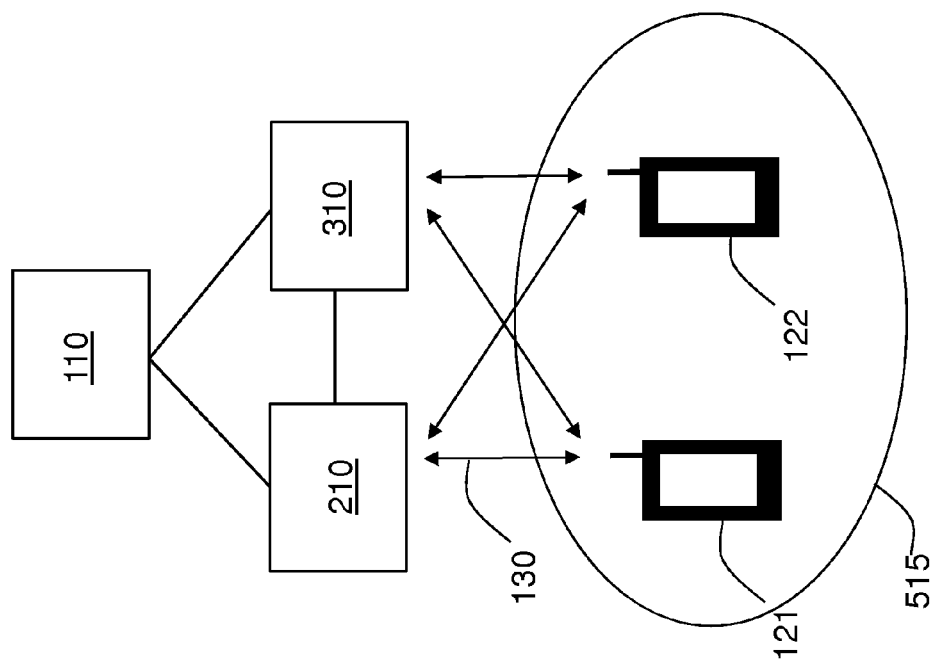

As shown in FIG. 5, in some embodiments, the communication system 100 may comprise a first network node 110 connected to a second network node 210 and a third network node 310. The third network node 310 may also be referred to as an access network node, radio network node or base station. The third network node 310 may serve one or more cells. In FIG. 5, the cell 515 denotes a CoMP cell in which the second and third network nodes 210, 310 are configured to provide coordinated multipoint (CoMP) data transmissions or reception to or from wireless devices 121, 122. This coordinated data transmission or reception may be performed from two or more antennas, wherein each of the second and third network nodes is associated with at least one of the two or more antennas. This means that the second network node 210 may comprise or be communicatively connected to at least one of the two or more antennas, and that the third network node 310 may comprise or be communicatively connected to at least one of the two or more antennas.

The third network node 310 may e.g. be an eNB, an eNodeB, or a Home Node B, a Home eNode B, a femto Base Station (BS), a pico BS, a Remote Radio Unit (RRU), a Radio over Fibre node, or any other network unit capable to serve a wireless device or a machine type communication device which is located in the cell 515 in the communications network 100. The second and third network nodes 210, 310 may be connected and configured to communicate with each other over, e.g. an X2 connection.

Figure 6:
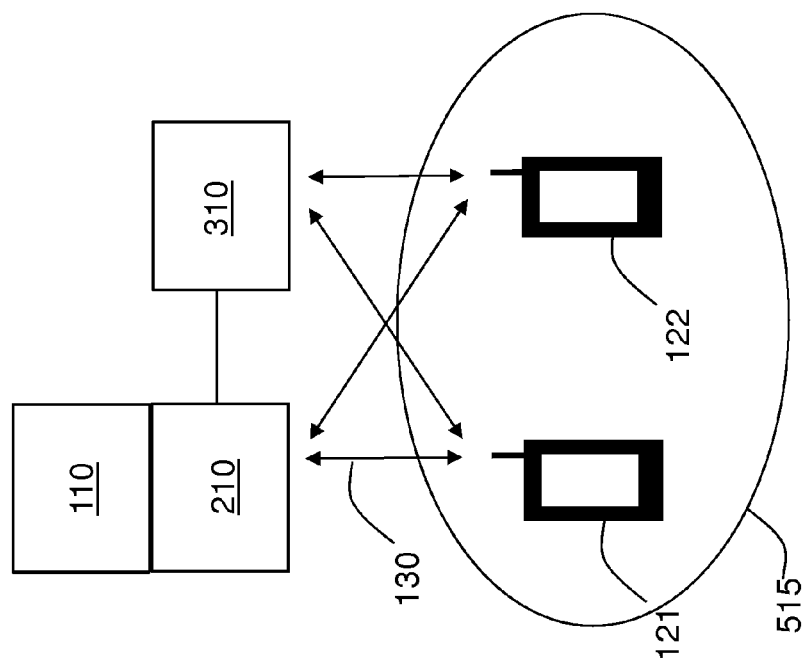

As shown in FIG. 6, in some embodiments, the first network node 110 may also be co-located with, or implemented in, any one of the second or third network node 210, 310. It should be noted that, in these embodiments, the first network node 110 and the second network node 210 or third network node 310 may e.g. be a single network unit, such as, a single eNB or eNodeB.

It should be noted that the communication system 100 may comprise any number of network nodes, such as, the second and third network node 210, 310, and that the wording "at least one second network node" is meant to comprise any number of network nodes configured to perform the coordinated multipoint (CoMP) data transmissions or reception from two or more antennas.

Furthermore, although many different possible implementations of the first, second and third network nodes 110, 210, 310 are described above, a typical implementation is that the first network node 110 is an MME node and the second network node 210 is an eNodeB. In another typical implementation, the first network node 110 is an eNodeB and the second network node 210 and/or third network node 310 are/is eNodeB(s) or RRUs.

A number of wireless devices may be located within the cell 115, 515 such as, e.g. the at least two wireless devices 121, 122. The wireless devices 121, 122 may also be referred to as user equipments or UEs. The terms "wireless device", "user equipment" and "UE" may be used interchangeably herein. Each wireless device 121, 122 is configured to communicate within the communications network 100 via the second and/or third network node 210, 310 over a radio link 130 when it is present in a cell 115, 515 served by the second and/or third network node 210, 310. The wireless devices 121, 122 may e.g. be mobile terminals, wireless terminals, mobile phones, stationary or mobile wireless devices for machine-to-machine communication, computers such as e.g. laptops, Personal Digital Assistants (PDAs) or tablet computers, with wireless capability, devices equipped with wireless interfaces, such as printers or file storage devices or any other radio network units capable of communicating over a radio link in the communications network 100.

Based on the discussion in the background portion above, it has been recognized that there is a need to make scheduling for coordinated transmission or reception of data feasible in large CoMP scenarios, e.g. enabling a CoMP system comprising a CoMP cell with a large amount of cooperative cells of different network nodes.

Thus, as part of the developing of the embodiments described herein, a problem will first be identified and discussed.

Figure 7:
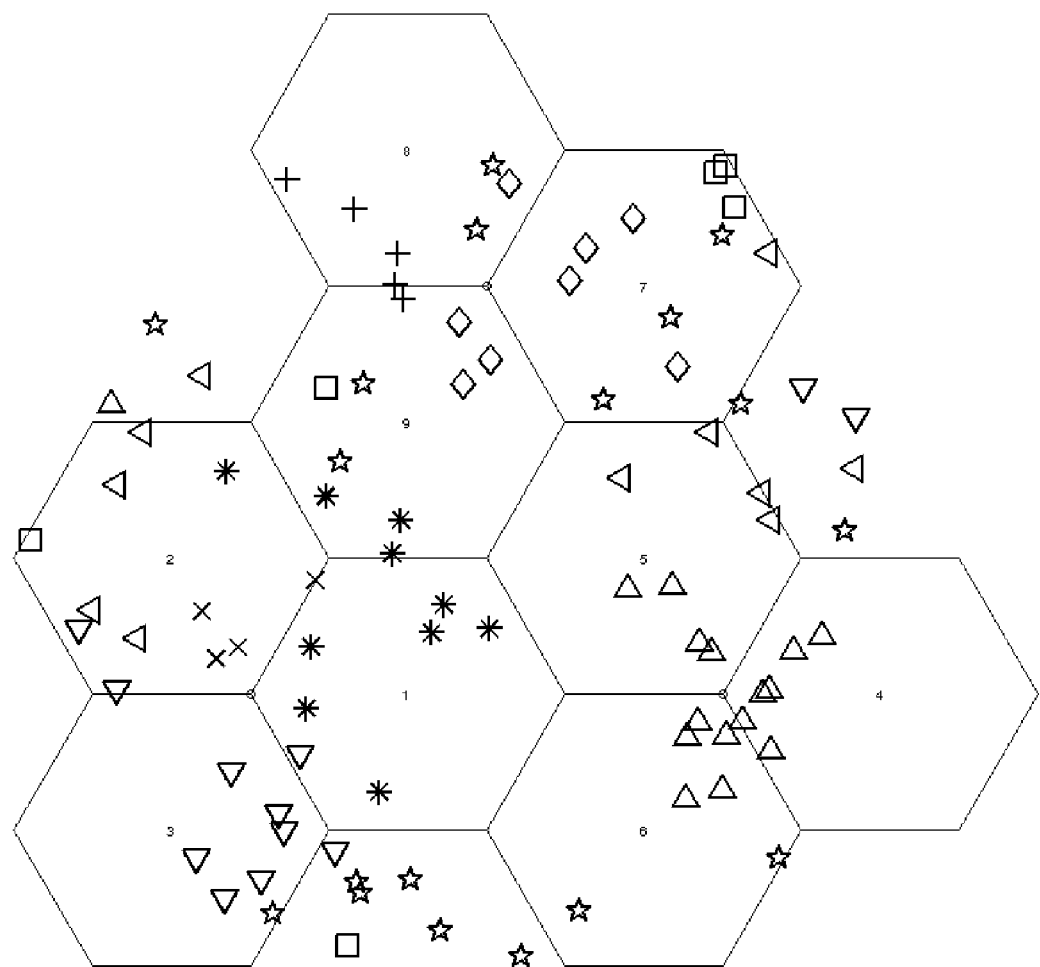
FIG. 7 is a schematic illustration of a CoMP scenario for network nodes in the communications network in FIGS. 3-4.

FIG. 7 shows an example of a CoMP scenario comprising a CoMP cell with nine (9) cells. In this example, each cell is served by a network node comprising two (2) transmit antennas. In the CoMP cell, each marker, such as, e.g. a triangle, a square, a star, a snowflake, etc., represents a wireless device comprising two (2) receiving antennas. Thus, in this CoMP cell, there are eighteen (18) transmit antennas and ninety (90) wireless devices.

When scheduling the wireless devices in this CoMP cell for coordinated transmission or reception of data, a scheduling algorithm may commonly be used to perform a wide search among the total amount of wireless devices in the CoMP cell. This may be performed in order to find wireless devices, and calculate their pre-coders, that both gives high throughput and fairness according to a proportionally fair policy.

Proportional fair (PF) may be described as a compromise-based scheduling algorithm. It attempts to maximize the throughput, while at the same time allowing all wireless devices at least a minimal level of service, i.e. fairness. In general, this may e.g. be performed by assigning each data flow with a data rate that is inversely proportional to its anticipated resource consumption. One example of a conventional PF-based algorithm is described in more detail in Kushner, H. J.; Whiting, P. A. (July 2004), "Convergence of proportional-fair sharing algorithms under general conditions", IEEE Transactions on Wireless Communications 3 (4): 1250-1259.

An exhaustive search among all possible wireless devices, pre-coders and number of layers or streams used for each wireless device would ideally give the best performance. However, this approach is typically not feasible from a scheduling complexity point-of-view, even if the CoMP cell is reasonably small. Instead, a greedy approach based on a single search path may be considered.

According to the greedy approach, in this search, one wireless device at a time, e.g. with 1 or 2 streams, is selected until a maximum number of transmission streams equal to the number of transmit antennas in the CoMP cell have been found or the total throughput is not increased any more by scheduling another wireless device for transmission. In the determining a first wireless device to schedule, a pre-coder for each wireless device and each possible number of streams to this wireless device must be calculated. Then, the SINR and data rates may be estimated, and a proportional fair metric may be calculated based on these. The wireless device and the number of streams to this wireless device that provide the highest metric may then be scheduled. Thereafter, a next wireless device is scheduled in the same way, but the number of wireless devices to choose from is now one wireless device less. When the scheduling process has finished, e.g. if the maximum number of scheduled streams has been reached, a joint downlink transmission may be performed for the wireless devices using the calculated pre-coders for the scheduled wireless devices.

This scheduling and joint downlink transmission may then be repeated for every scheduling instance, i.e. for each Transmission Time Interval (TTI). One TTI may here correspond to 1 ms as defined in the LTE standard.

However, executing the scheduling algorithm for the wireless devices in this CoMP cell, as described in reference to FIG. 7 above, will result in that a large number of pre-coder calculations have to be performed. The scheduling complexity of the greedy approach based on a single search path is shown by the fully filled bars in the schematic diagram of FIG. 8.

It should be noted that this greedy approach is also a significant complexity reduction compared to an ideal algorithm. The above described best performing exhaustive search would require significantly more pre-coder calculations proportional to the number of considered alternatives, and this will grow exponentially with the number of wireless devices.

Figure 8:
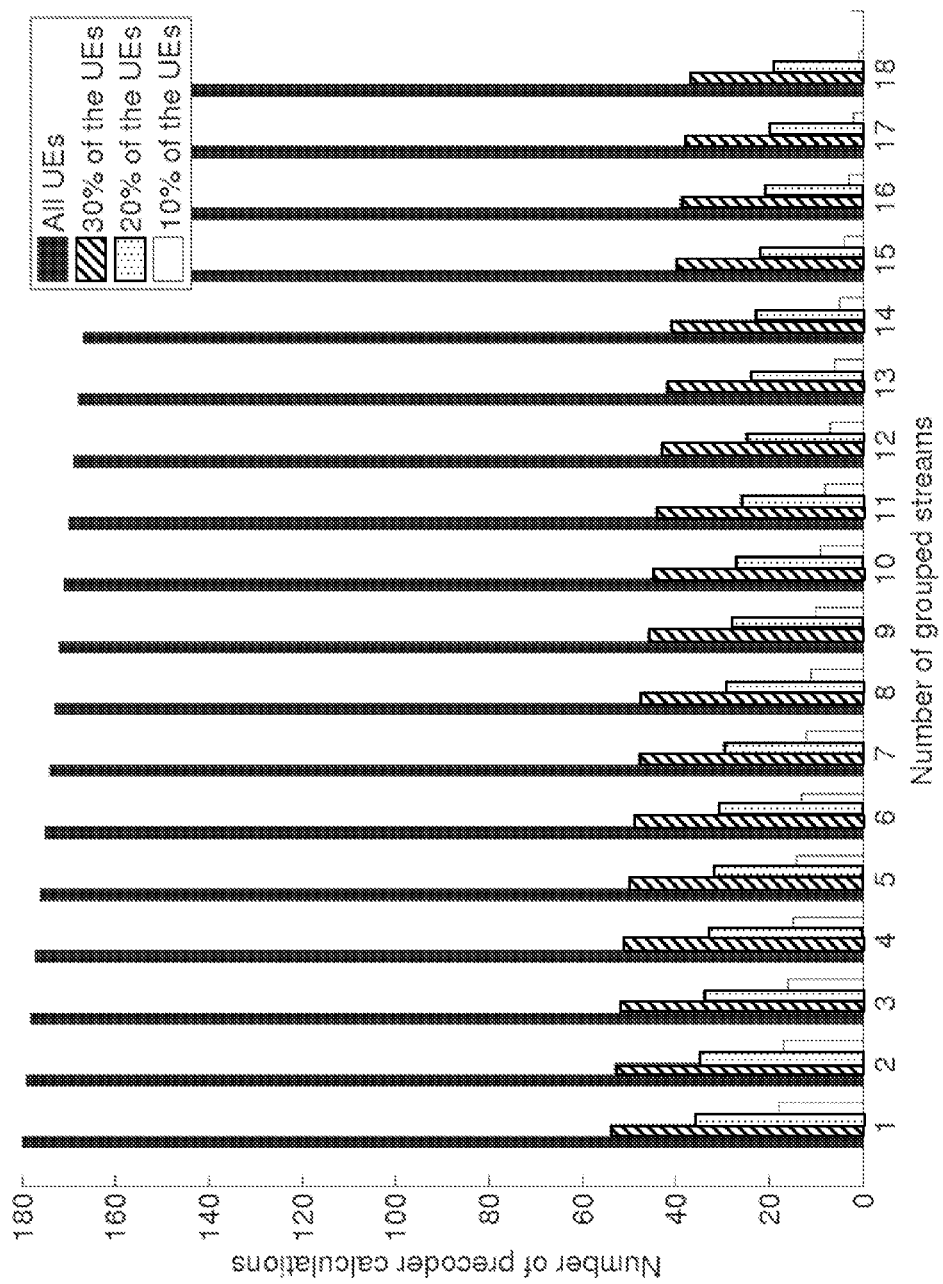
FIG. 8 is a schematic diagram depicting the complexity of the CoMP scenario in FIG. 5.

In the schematic diagram of FIG. 8, the y-axis shows the number of pre-coder calculations performed and the x-axis shows the number of grouped streams, i.e. the number of streams that will be transmitted to the currently scheduled wireless devices. Since each wireless device may receive two (2) layers or streams, i.e. one for each receiving antenna, 180 pre-coder calculations are performed in the process of determining the first wireless device to be scheduled. When determining the second wireless device together with the number of streams to schedule to this wireless device, 178 pre-coder calculations are performed. The exact slope of the curve showing the number of pre-coder calculations as a function of the number of grouped or scheduled streams depends on the number of streams that will be transmitted to each wireless device. In FIG. 8, it is assumed that two streams are transmitted to each wireless device.

Furthermore, from the schematic diagram of FIG. 8, it may also be seen that if the number of wireless devices inputted to the scheduling algorithm to possibly be scheduled for coordinated transmission or reception of data could be reduced to only e.g. 30%, 20% or 10% of the wireless devices in the CoMP cell, then the scheduling complexity would be significantly reduced. This reduction in scheduling complexity is shown by the striped, dotted and blank bar in the schematic diagram of FIG. 8, respectively.

For example, if only 10% of the wireless devices in the CoMP cell are used in the scheduling, then the number of pre-coder calculations when determining the first wireless device to schedule would be reduced to 18.

Therefore, in accordance with the embodiments described herein, by selecting a subset of wireless devices from different spatial groups or clusters of wireless devices in a CoMP cell, and thus excluding wireless devices in the CoMP cell which are unlikely to be scheduled in the coordinated data transmission or reception, the number of wireless devices inputted to the scheduling algorithm to possibly be scheduled for coordinated transmission or reception of data may be reduced.

As shown by FIG. 8, this will result in a reduction in the scheduling complexity of the scheduling algorithm. Thus, the scheduling for coordinated transmission or reception of data according to the embodiments herein may be applied to a large CoMP scenario.

Examples of embodiments of a method in a first network node 110 for coordinating data transmissions between wireless devices 121, 122 and two or more antennas associated with at least one second network node 210, 310 in a wireless communication network 100, will now be described with reference to a flowchart depicted in FIG. 9.

Figure 9:
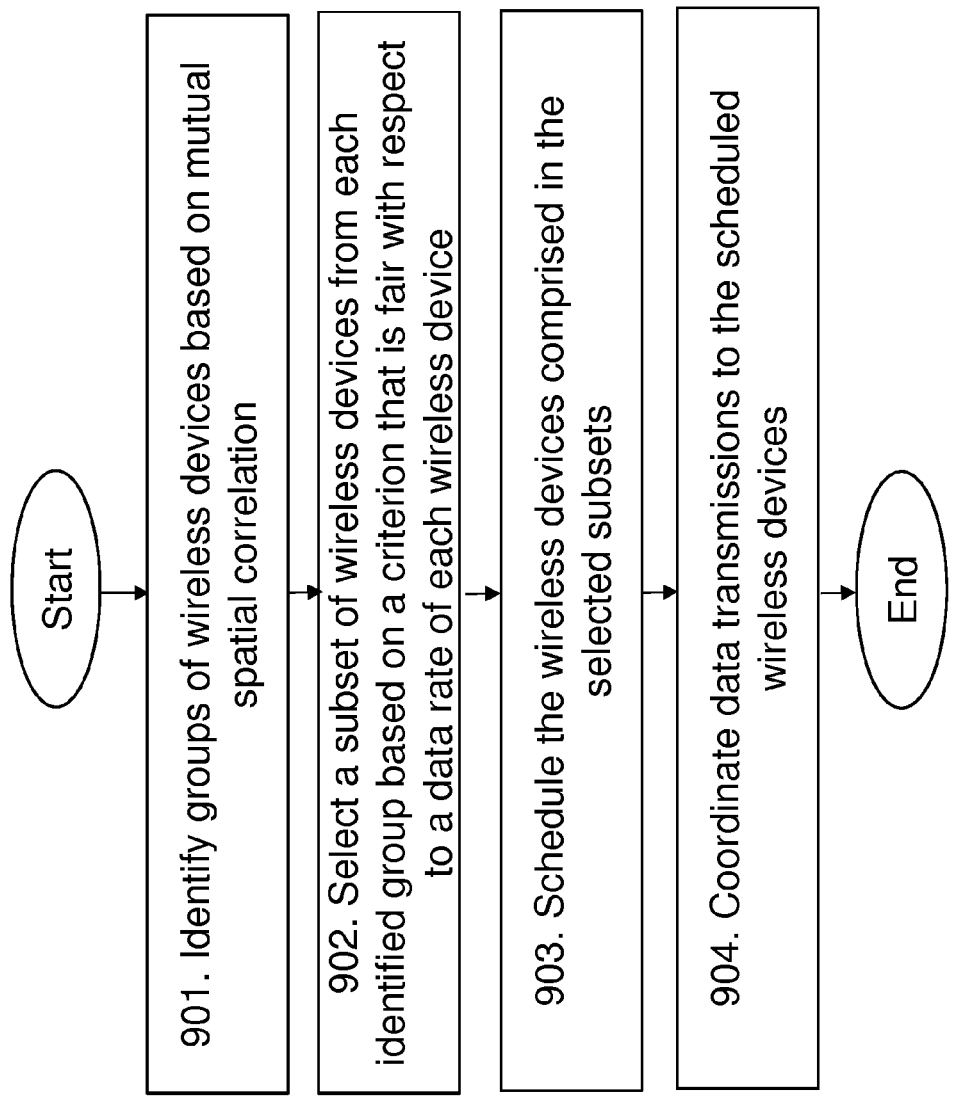
FIG. 9 is a flowchart depicting embodiments of a method in a network node.

FIG. 9 is an illustrated example of exemplary actions or operations which may be taken by the first network node 110. The wireless devices 121, 122 are served by the at least one second network node 210, 310. The at least one second network node 210, 310 is also configured to perform coordinated data transmission and reception, also referred to as CoMP transmission and reception. The at least one second network node 210, 310 may perform coordinated data transmission and reception of data to and from the wireless devices 121, 122 located within a cell 115 for which the at least one second network node 210, 310 is configured for coordinated data transmission and reception. As described above, in some embodiments, the first network node 110 may be one of the at least one second network node 210, 310.

Although, as described above, there are many different possible implementations and configurations of the first and at least one second network nodes, in one example scenario, the first network node 110 is an MME and the at least one second network node 210, 310 is/are eNodeB(s). In another example scenario, the first network node 110 is an eNodeB and the at least one second network node 210, 310 is/are RRU(s). The method may comprise the following actions, which actions may be taken in any suitable order.

Action 901

In this action, the first network node 110 identifies two or more groups of wireless devices based on mutual spatial correlation between the wireless devices 121, 122.

This advantageously allows the first network node 110 to identify groups of wireless devices, in which groups the wireless devices have a high mutual spatial correlation with each other. This is advantageous since, when later selecting wireless devices from different groups, the selected wireless devices will have low mutual spatial correlation with each other and are thus likely to also have a good spatial compatibility for coordinated transmission and reception of data on the same non-orthogonal resources.

In some embodiments, the first network node 110 may identify the two or more groups of wireless devices by grouping the wireless devices into fixed groups of wireless devices based on the cell associations of the wireless devices in the wireless communications network 100. This is because wireless devices located in one cell or a set of cells usually have low mutual spatial correlation with wireless devices located in another cell or another set of cells.

In one example, all wireless devices located in one cell or set of cells may be identified as a group or cluster of wireless devices, e.g. grouping all wireless devices served by the same one of the at least one second network node 210, 310 in one group or cluster. A wireless device 121, 122 may move from one group or cluster of wireless device to another group or cluster of wireless devices in a Handover (HO) procedure, if the wireless device 121, 122 moves and the serving cell changes, e.g. from the cell served by the second network node 210 to the cell served by the third network node 310.

In some embodiments, the first network node 110 may identify the two or more groups of wireless devices by grouping the wireless devices into dynamic groups of wireless devices based on radio signal measurements.

For example, the dynamic groups of wireless devices may be determined by using a k-means algorithm based on Reference Signal Received Power, RSRP, measurements. The k-means algorithm, or k-means clustering algorithm, is a method which aims to partition n observations into k clusters in which each observation belongs to the cluster with the nearest mean, or mean value. One observation may be the RSRP measurements between a wireless device and the antennas of the at least one second network node 110, 210. The wireless devices may be divided into groups or clusters of wireless devices using the k-means algorithm based on these observations.

One advantage with using k-means is that efficient algorithms to solve the NP-hard, i.e. nondeterministic polynomial time-hard, clustering problem are already available. By considering the channels between a wireless device and the antennas of the at least one second network node 110, 210 in the CoMP cell, e.g. through the RSRP measurements, in the clustering, substantially optimal groups in terms of spatial correlation may be found; this, as opposed to when identifying the groups based on e.g. cell association. Thus, this is one way of ensuring a low mutual spatial correlation between the different groups or clusters of wireless devices.

Alternatively, the dynamic groups of wireless devices may be determined by using the minimum sum of the squared differences in RSRP measurements. This may be performed by e.g. grouping the wireless devices such that the minimum sum of the squared difference in RSRP measurements to all of the at least one second network nodes 210, 310 between any two wireless devices 121, 122 in different groups or clusters are maximized. This is another way of ensuring a low mutual spatial correlation between the different groups or clusters of wireless devices 121, 122.

It should also be noted that the identifying of two or more groups of wireless devices as described in this action, may be performed continually according to a CSI reporting configuration. This means that identifying of two or more groups of wireless devices may be based on any available CSI information, e.g. a Precoding Matrix Index (PMI), Rank Index (RI) and/or Channel Quality Index (CQI). In the CSI reporting, the wireless devices 121, 122 may report any available CSI to the at least one second network node 210, 310. This CSI reporting may comprise the CSI for any radio link within the group or cluster of wireless devices to which the wireless device 121, 122 belongs, not only e.g. the strongest radio link. It should also be noted that the identification may vary depending on which CSI is reported.

This also means that the identifying of two or more groups of wireless devices may be repeated with a time period in order of 20-200 ms depending on the configuration. This provides for a suitable time period for performing the identifying of two or more groups of wireless devices since shorter time periods are not likely to result in any large differences in the groups or clusters of wireless devices. For example, in case the CSI is not updated, there may be little reason in redoing the identification.

It may here also be noted that the Actions 902-904 described below, i.e. the selecting, scheduling and coordinating, may be performed for each scheduling instance or Transmission Time Interval, TTI. This means that the selecting, scheduling and coordinating described in Actions 902-904 may be repeated with a time period in order of milliseconds (ms).

Action 902

In this action, the first network node 110 selects a subset of wireless devices from two or more of the identified groups of wireless devices based on a criterion that relates to a data rate of each of the wireless devices. This selection of a subset of wireless devices to be scheduled in the coordinated data transmission or reception may herein also be referred to as "pruning" or "pre-scheduling" of the wireless devices. This is because it reduces the number of wireless devices 121, 122 that is inputted to the scheduling of the coordinated data transmission or reception of the at least one second network node 210, 310.

Thus, for each scheduling instance or TTI and identified group or cluster of wireless devices, this pre-scheduling selects some of the wireless devices in each identified group or cluster of wireless devices by considering a criterion that relates to a data rate of each of the wireless devices. The criterion may also be referred to as a selection metric.

The wireless devices selected from all identified groups or clusters of wireless devices will comprise the wireless devices which are considered by the scheduling described in Action 903. Hence, this pre-scheduling should be configured to select the wireless devices that are likely to be scheduled if a full wide-search scheduling was used.

It should be noted that in order to achieve fairness and good performance, the most likely wireless devices to be scheduled for coordinated data transmission and reception of data, in a given scheduling instance or TTI, are the wireless devices that are comprised in different identified groups or clusters of wireless devices as described in Action 901. As mentioned above, this is because wireless devices within these groups of wireless devices have high mutual spatial correlation with each other.

Also, selecting a high number of wireless devices from the two or more of the identified groups or clusters of wireless devices mean that spectral efficiency is close to what may be achieved when inputting all of the wireless devices 121, 122 into the scheduling for a CoMP scenario.

However, if a high number of wireless devices from the two or more of the identified groups or clusters of wireless devices is selected, then the complexity of the scheduling will be increased relatively. On the other hand, if a low number of wireless devices from the two or more of the identified groups or clusters of wireless devices is selected, then the complexity of the scheduling will be relatively low. This, however, will result in that the loss in spectral efficiency will be higher.

Also, the selected number of wireless devices from the two or more of the identified groups or clusters of wireless devices should be higher than the number of wireless devices that are scheduled by the scheduling algorithm. This in order to make it possible for the scheduling algorithm to select from a large enough group of wireless devices to enable good spatial compatibility and high throughput of the coordinated data transmission and reception.

Hence, it can be seen that there is a trade-off between performance and complexity that is governed by the number of wireless devices from the two or more of the identified groups or clusters of wireless devices that are selected in this pre-scheduling.

Therefore, first, a number of wireless devices which are to be selected from the two or more of the identified groups or clusters of wireless devices may be determined by or set in the first network node 110.

In some embodiments, the same number of wireless devices from the two or more of the identified groups or clusters of wireless devices may be selected, i.e. a fixed number of wireless devices from each group or cluster of wireless devices. Here, assuming that the number of groups or clusters of wireless devices is also fixed, the total number of wireless devices selected in the subset of wireless devices will also be fixed, and thereby the complexity of the scheduling algorithm will be also fixed. An advantage with having fixed complexity is that there is often a certain processing capacity available which is desired to be matched.

Thus, the performance of the pre-scheduling in this case will depend highly on the system load. This means that, at low system load, all wireless devices may be selected by the pre-scheduling, whereby the scheduling will have the same complexity and performance as compared to when inputting all of the wireless devices 121, 122 into the scheduling of the CoMP scenario directly. At high load on the other hand, very few of the total number of wireless devices may be selected by the pre-scheduling, wherein the scheduling will have significantly lower complexity as compared to when inputting all of the wireless devices 121, 122 into the scheduling of the CoMP scenario directly.

In some embodiments, the number of wireless devices selected in a subset of wireless devices from an identified group of wireless devices may be at least partly based on the number of wireless devices that are comprised in the identified group of wireless devices compared to the total number of wireless devices in the identified groups of wireless devices, e.g. a fixed total number of wireless devices selected in the subset of wireless devices.

Thus, a more dynamic number of wireless devices may be selected by selecting a certain fraction, e.g. 20%, of the total number of wireless devices from an identified group or cluster of wireless devices. Alternatively, a fixed fraction of the total number of wireless devices from one or more identified group or cluster of wireless devices may be selected. Thus, any differences in the number of wireless devices within each identified group or cluster of wireless devices may be taken into account.

It should be noted that when a certain fraction of the number of wireless devices within each identified group or cluster of wireless devices are selected for the subset of wireless devices, both the performance and complexity of the scheduling will be significantly lower than when inputting all wireless devices 121, 122 into the scheduling for the CoMP scenario directly.

In some embodiments, the number of wireless devices which are to be selected from the two or more of the identified groups or clusters of wireless devices may be determined by or set by having the total number of wireless devices selected in the subset of wireless devices being a fixed total number of wireless devices. In this case, the number of wireless devices selected for the subset of wireless devices from an identified group of wireless devices may at least partly be based on the current load in this identified group of wireless devices.

By choosing a fixed total number of wireless devices to be selected in the pre-scheduling, but letting the number of wireless devices from the two or more of the identified groups or clusters of wireless devices be dynamic and change according to varying load in the different identified groups or clusters of wireless devices, the complexity of the scheduling is kept fixed and the performance is improved compared to e.g. having a fixed number of wireless devices from the two or more of the identified groups or clusters of wireless devices.

Also, here, the number of wireless devices selected from the two or more of the identified groups or clusters of wireless devices may depend on the fraction of the total number of wireless devices that are associated to each identified group or cluster of wireless devices, as well as, the fixed total number of wireless devices that will be selected.

As an example of the choice of the number of wireless device, assume that the CoMP system comprises four (4) identified groups or clusters of wireless devices. Also, assume that the scheduling processing capability in the first network node 110 may only manage the computations of the scheduling algorithm for about 20 wireless devices.

The total number of wireless devices selected for the subset of wireless devices in the CoMP system is then fixed to 20, independent of the system load. If the system load is low, i.e. less than 20 wireless devices, then all wireless devices in the CoMP system may be selected in the pre-scheduling. On the other hand, if the system load is high, only a small fraction of all wireless devices in the CoMP system may be selected in the pre-scheduling. In this case, the number of wireless devices selected from the two or more of the identified groups or clusters of wireless devices is preferably dependent on the fraction of the total number of wireless devices in each identified group or cluster of wireless devices.

For example, assume further that there are 100 wireless devices in the CoMP system, and that the number of wireless devices associated to each of the four groups or clusters of wireless devices is 10, 20, 30 and 40, respectively. So, in accordance with the above, the pre-scheduling should select 20 wireless devices among these 100 wireless devices, based on the number of wireless devices in each identified group or cluster of wireless devices. This will result in that the pre-scheduling selects 2, 4, 6 and 8 wireless devices, respectively, from the four groups or clusters of wireless devices.

A more generalised description of this is shown by Eq. 1:

$$nUEs_{pre\text{-}scheduled,j} = \frac{nUEs_{active,j} * nUEs_{pre\text{-}scheduled}}{nUEs_{active}}, \quad (Eq. 1)$$

where $nUEs_{pre\text{-}scheduled,j}$ is the number of wireless devices that should be pre-scheduled in the identified group or cluster j, $nUEs_{active,j}$ is the number of wireless devices that are active in the identified group or cluster j, $nUEs_{pre\text{-}scheduled}$ is the total number of wireless devices to be selected in the pre-scheduling, and $nUEs_{active}$ is the total number of active wireless devices in the CoMP system.

Thus, in accordance with the above, it may be seen that the number of selected wireless devices in each group or cluster of wireless devices may e.g. be proportional to the number of wireless devices present in a group or cluster of wireless devices, and may also depend on the load of wireless devices in the CoMP scenario and also the spatial degree of freedom available, i.e. the total number of transmit or reception antennas.

Secondly, when a number of wireless devices has been determined by or set in the first network node 110, the first network node 110 may apply the criterion that relates to a data rate of each of the wireless devices in order to single out the wireless devices from the two or more of the identified groups or clusters of wireless devices that are to be comprised in the subset of wireless devices that are to be inputted into the scheduling.

In order to select the wireless devices that are most likely to be scheduled in by the scheduling algorithm, the first network node 110 may consider a criterion based on the same calculation of priority as is considered in the scheduling by e.g. a PF-based SDMA scheduling algorithm.

In this case, the priority P may e.g. be calculated as shown by Eq. 2:

$$P = \frac{T^\alpha}{R^\beta} \quad (Eq. 2)$$

where T is the instantaneous data rate of the wireless device,
R is the historical average data rate of the wireless device, and
α and β tune the "fairness" of the scheduling.

In the extreme case, when α=0 and β=1, the scheduling makes sure that all users get the same average bitrate. If α=1 and β=0, the scheduling will always serve the users with the best channel conditions to maximize the throughput. A typical choice is however α=1 and β=1, which gives a proportionally fair scheduling that takes both fairness and throughput into account. Thus, the same criterion may be used by the first network node 110 to select the subset of wireless devices from the two or more of the identified groups or clusters of wireless devices which are to be inputted into the scheduling.

The historical average data rate of each wireless device may be known in the first network node 110 for both the pre-scheduling and the scheduling. However, the instantaneous rate of each wireless device may not be available to the pre-scheduling because it depends on the joint pre-coder calculation of the scheduling. This is normally a complex calculation performed by a SDMA scheduling algorithm.

One alternative, with very low complexity, is then to only consider the historical average data rate in the pre-scheduling. This means that, in some embodiments, the criterion may relate to the historical average data rates of each of the wireless devices. In this case, the criterion may be made fair with respect to the historical average data rate.

Another alternative is to estimate the instantaneous data rate of the wireless device, and use this estimate of the instantaneous data rate of the wireless device in the pre-scheduling. This means that, in some embodiments, the criterion may further relate to the instantaneous data rate of each of the wireless devices. In this case, the criterion may be made proportional fair with respect to the instantaneous data rate.

A further alternative is to estimate the relative data rates between different wireless devices, and use this estimate of the relative data rates between different wireless devices in the pre-scheduling. This means that, in some embodiments, the criterion may further relate to the relative data rates among the wireless devices. In this case, the criterion may be made proportional fair with respect to the relative data rates.

In the above cases, the instantaneous data rate of each of the wireless devices or the relative data rates among the wireless device may be estimated based on one or more of: Reference Signal Received Power (RSRP) measurements; Signal-to-Noise ratio (SNR) measurements; and Channel norm measurements. Here, the Channel norm measurement may be between a wireless device and all transmission points in the CoMP scenario.

It should be noted that the embodiments described above in this Action 902 advantageously provides for a low-complexity pre-scheduling prior to scheduling wireless devices for the coordinated data transmission or reception of the at least one second network node 210, 310 as described in Action 903 below.

Action 903

When a subset of wireless devices has been selected, the first network node 110 schedules wireless devices from the selected subset of wireless devices for the coordinated data transmission or reception of the at least one second network node 210, 310. This means that the first network node 110 selects and schedules some of the wireless devices in the selected subset of wireless devices. For these wireless devices, the first network node 110 may calculate pre-coders, i.e. pre-coder vectors, to be used when performing the coordinated data transmission or reception of the at least one second network node 210, 310 to these wireless devices.

By scheduling wireless devices from the selected subset of wireless devices in this way, the first network node 110 may apply its scheduling algorithm on a smaller set of wireless devices, which reduces the scheduling complexity, while still maintaining the joint transmission gains in large CoMP scenarios since only wireless devices that are likely to be scheduled in the coordinated data transmission or reception are comprised in the selected subset of wireless devices.

In some embodiments, the first network node 110 may select and schedule the wireless devices by determining which of the wireless devices comprised in the selected subset of wireless devices to schedule on the same resource block based on the Channel State Information, CSI, for each wireless device.

In some embodiment, the scheduling is performed by proportional fair-based (PF-based) Space Division Multiple Access (SDMA) scheduling. This may be performed by applying a PF-based SDMA algorithm in the first network node 110 to the selected subset of wireless devices. The PF-based SDMA scheduling algorithm also performs a wide search among the selected subset of wireless devices to find the wireless devices, and calculate their corresponding pre-coders, that both gives a high throughput and fairness according to its proportional fair policy.

In this case, the PF-based SDMA algorithm may determine which of the wireless devices comprised in the selected subset of wireless devices to schedule on the same resource block based on the CSI for each wireless device.

The PF-based SDMA scheduling algorithm will refine the wireless device selection made by the low-complexity pre-scheduling. This shows the importance of selecting a high enough number of wireless devices in each identified group or cluster of wireless devices in the pre-scheduling. In fact, how well the pre-scheduling may estimate the priority P of the different wireless device in the selected subset of wireless devices as compared to the priorities calculated by the PF-based SDMA scheduling algorithm may affect the impact of the total number of wireless devices selected by the pre-scheduling.

For example, if only the historical data rate R of the wireless device is considered by the pre-scheduling, i.e. $\alpha=0$ and $\beta=1$, then the estimate of P may be quite different from the priorities calculated by the PF-based SDMA scheduling algorithm, e.g. since the PF-based SDMA scheduling algorithm may be using $\alpha=1$ and $\beta=1$. The impact of this, however, may be alleviated by selecting a larger number of wireless devices in the pre-scheduling in Action 902.

In some embodiments, when a wireless device that is comprised in a subset of wireless devices, but is not scheduled by the first network node 110, the wireless device may be maintained by the first network node 110 in its respective selected subset of wireless devices. In other words, the pre-scheduling may keep these wireless devices in a que until they are scheduled by e.g. the PF-based SDMA scheduling algorithm. Thus, the wireless device may be scheduled by the first network node 110 at another scheduling instance or TTI.

Alternatively, the pre-scheduling may keep these wireless devices in the que until the que is flushed and new priorities are calculated, in order to reduce the amount of calculations performed by the pre-scheduling. Thus, the wireless device may be maintained by the first network node 110 in its respective selected subset of wireless devices until a completely new subset of wireless devices are selected by the first network node 110.

In some embodiments, the wireless devices that are selected by the pre-scheduling, but not scheduled by the PF-based SDMA scheduling algorithm, may keep their high priority e.g. as long as their instantaneous bitrates do not change.

By in this way maintaining wireless devices in the subset of wireless devices that are still likely to be scheduled, the selecting of the subset of wireless device may be made more efficient, e.g. be performed in a faster way with fewer necessary calculations.

In some embodiments, the scheduling may be performed on different orthogonal resources. This may be performed whenever deemed suitable in order to avoid interference in the wireless communications network 100.

It should also be noted that by selecting a subset of wireless devices as described in Action 902, i.e. reducing the number of wireless devices 121, 122 inputted to the scheduling, for the scheduling as described here in Action 903, the scheduling complexity of the coordinated data transmission and reception is reduced for each scheduling instance or TTI.

Action 904

When wireless devices have been scheduled for the coordinated data transmission or reception of the at least one second network node 210, 310, the first network node 110 coordinates the data transmission or reception between the at least one second network node 210, 310 and the scheduled wireless devices.

By coordinating the data transmission or reception in this way based on the scheduled wireless devices, the radio network capacity in the wireless communications network 100 and the user bitrate for a given scheduling processing capability for the CoMP system is improved in comparison with conventional CoMP systems.

The coordinating may be performed with pre-coders, i.e. pre-coding vectors, determined in the scheduling as described in Action 903.

In some embodiments, the coordinated data transmission or reception may be a downlink joint transmission precoding. This coordinated data transmission to the scheduled wireless devices 121, 122 is then performed co-operatively by the at least one second network node 210, 310.

Alternatively, the coordinated data transmission or reception may be an uplink Multi-User Multiple-Input Multiple-Output, MU-MIMO, joint transmission. In this case, the at least one second network node 210, 310 co-operatively receive the coordinated data transmission from the wireless devices 121, 122.

Figure 10:
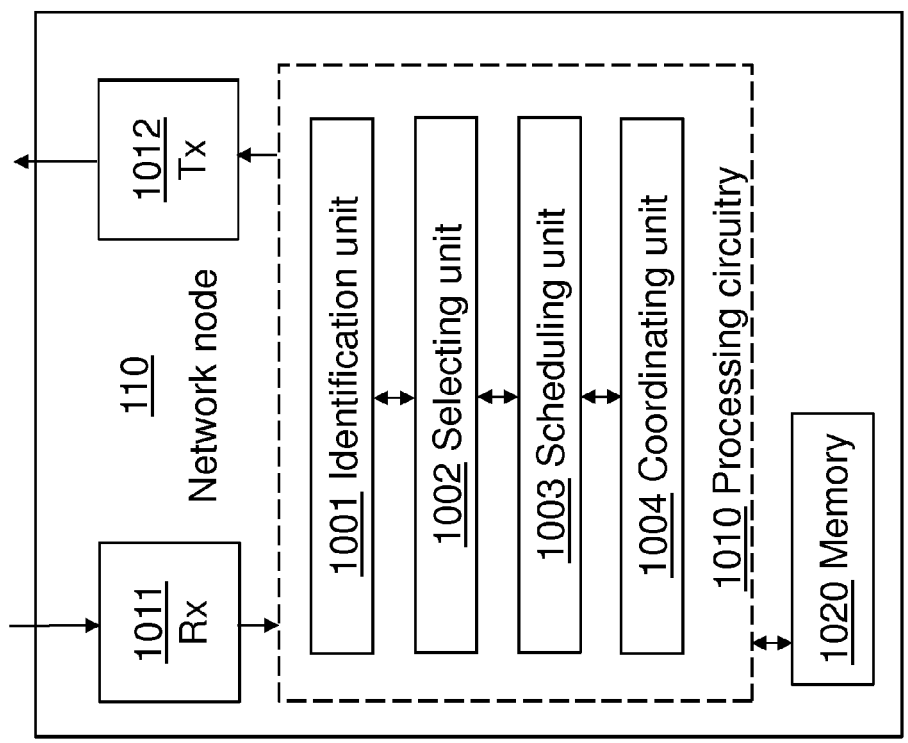
FIG. 10 is a block diagram depicting embodiments of a network node.

To perform the method actions in the first network node 110 for coordinating data transmission and reception between wireless devices 121, 122 and two or more antennas associated with at least one second network node 210, 310 in a wireless communication network 100, the first network node 110 may comprise the following arrangement depicted in FIG. 10.

FIG. 10 shows a schematic block diagram of embodiments of the first network node 110. The wireless devices 121, 122 are served by the at least one second network node 210, 310. The at least one second network node 210, 310 are configured to perform coordinated data transmission or reception. It should be noted that in some embodiments the first network node 110 may be one of the at least one second network node 210, 310.

The first network node 110 comprises an identification unit 1001. The identification unit 1001 is configured to identify two or more groups of wireless devices based on mutual spatial correlation between the wireless devices 121, 122.

In some embodiments, the identification unit 1001 may identify the two or more groups of wireless devices based on existing groups of wireless devices in the wireless communications network 100. In some embodiments, the identification unit 1001 may identify the two or more groups of wireless devices by grouping the wireless devices into fixed groups of wireless devices based on the cell associations of the wireless devices in the wireless communications network 100.

In some embodiments, the identification unit 1001 may identify the two or more groups of wireless devices by grouping the wireless devices into dynamic groups of wireless devices based on radio signal measurements. In this case, the dynamic groups of wireless devices may be determined by the identification unit 1001 by using a k-means algorithm based on RSRP measurements, or by using the minimum sum of the squared differences in RSRP measurements.

In some embodiments, the identification of the two or more groups of wireless devices based on mutual spatial correlation between the wireless devices 121, 122 may be performed continually according to the CSI reporting configuration.

The first network node 110 also comprises a selection unit 1002. The selection unit 1002 may also be referred to as a pre-scheduler, pre-scheduling unit or pruning unit. The selection unit 1002 is configured to select a subset of wireless devices from the two or more of the identified groups of wireless devices identified in the identification unit 1001 based on a criterion that relate to a data rate of each of the wireless devices.

First, the selection unit 1002 may select a number of wireless devices selected for the subset of wireless devices. This may also already be determined or set in the selection unit 1002. In some embodiments, the total number of wireless devices selected in the subset of wireless devices may be a fixed total number of wireless devices. Here, the number of wireless devices selected for the subset of wireless devices from an identified group of wireless devices may at least partly be based on the current load in this identified group of wireless devices.

In some embodiments, the number of wireless devices selected for the subset of wireless devices from an identified group of wireless devices may further at least partly be based on the number of wireless devices that are comprised in this identified group of wireless devices compared to the total number of wireless devices in the identified groups of wireless devices, and the fixed total number of wireless devices selected in the subset of wireless devices.

Secondly, the selection unit 1002 may select the subset of wireless devices. In some embodiments, the criterion may relate to the historical average data rates of each of the wireless devices. In some embodiments, the criterion may further relate to the instantaneous data rate of each of the wireless devices or the relative data rates among the wireless devices.

In some embodiments, the instantaneous data rate of each of the wireless devices or relative data rates among the wireless device may be estimated based on one or more of RSRP measurements, SNR measurements, and Channel norm measurements.

The first network node 110 further comprises a scheduling unit 1003. The scheduling unit 1010 is configured to schedule wireless devices from the selected subset of wireless devices for the coordinated data transmission or reception.

In some embodiments, the scheduling unit 1003 may maintain a wireless device that is comprised in the subset of wireless devices, but not scheduled, in the selected subset of wireless devices. This may be performed until the wireless device is scheduled at another scheduling instance. Alternatively, this may be performed until a completely new subset of wireless devices are selected by the selecting unit 1002.

In some embodiments, the scheduling unit 1003 may determine which of the wireless devices comprised in the selected subset of wireless devices to schedule on the same resource block based on the CSI for each wireless device.

In some embodiments, the scheduling unit 1003 may comprise a PF-based SDMA scheduling algorithm configured to perform the scheduling. In some embodiments, the scheduling may be performed on different orthogonal resources.

Also, the first network node 110 further comprises a coordinating unit 1004. The coordination unit 1004 is configured to coordinate the data transmission or reception between two or more antennas associated with the at least one second network node 210, 310 and the scheduled wireless devices.

In some embodiments, the coordinated data transmission may be a downlink joint transmission precoding. In some embodiments, the coordinated data transmission may be an uplink MU-MIMO joint transmission. The coordinated transmission and reception of data may be performed with pre-coders, or precoding vectors, determined by the scheduling unit 1003.

It should be noted that the selection unit 1002, the scheduling unit 1003, and the coordinating unit 1004 may perform the selecting, the scheduling and the coordinating for each scheduling instance, e.g. for each TTI.

The first network node 110 may comprise a processing circuitry 1010, which may also be referred to as processing unit. The processing circuitry 410 may comprise one or more of the identification unit 1001, the selection unit 1002, the scheduling unit 1003 and coordinating unit 1004.

The embodiments herein for coordinating data transmission and reception between wireless devices 121, 122 and two or more antennas associated with at least one second network node 210, 310 in a wireless communication network 100 may be implemented through one or more processors, such as the processing circuitry 1010 in the first network node 110 depicted in FIG. 10, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 1010 in the first network node 110. The computer program code may e.g. be provided as pure program code in the first network node 110 or on a server and downloaded to the first network node 110.

The first network node 110 may further comprise a memory 1020 comprising one or more memory units. The memory 1020 may be arranged to be used to store data, such as, e.g. the information associated with wireless devices that are comprised in a subset of wireless devices but not yet scheduled, to perform the methods herein when being executed in the first network node 110.

Those skilled in the art will also appreciate that the processing circuitry 1010 and the memory 1020 described above may refer to a combination of analog and digital circuits, and/or one or more processors configured with software and/or firmware, e.g. stored in a memory, that when executed by the one or more processors such as the processing circuitry 1010 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The terminology used in the detailed description of the particular exemplary embodiments illustrated in the accompanying drawings is not intended to be limiting of the described methods, the first network node 110 or the computer program, which instead are limited by the enclosed claims.

As used herein, the term "and/or" comprises any and all combinations of one or more of the associated listed items.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof.

Unless otherwise defined, all terms comprising technical and scientific terms used herein have the same meaning as commonly understood by one of ordinary skill in the art to which the described embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The invention claimed is:

1. A method at a network node configured for operation in a wireless telecommunication network, the method comprising:
   jointly scheduling, with respect to recurring scheduling instances, Coordinated Multi-Point (CoMP) transmissions to or receptions from respective wireless devices in a candidate set of wireless devices operating in a CoMP cell comprising two or more individual cells of the network, including limiting a scheduling complexity in each scheduling instance by considering in a scheduling algorithm only a pre-scheduled subset from the candidate set; and
   determining the pre-scheduled subset by:
      grouping the wireless devices comprising the candidate set into two or more groups, so that wireless devices from the same group are known or estimated to have high mutual spatial correlation, and so that wireless devices from different groups are known or estimated to have low mutual spatial correlation;
      ranking the wireless devices in the groups according to a data rate criterion for each wireless device, reflecting a likelihood of the wireless device being scheduled by the scheduling algorithm; and
      selecting one or more wireless devices from each group for inclusion in the pre-scheduled subset, based on the rankings.

2. The method according to claim 1, wherein the data rate criterion relates to the historical average data rates of each of the wireless devices.

3. The method according to claim 2, wherein the data rate criterion further relates to the instantaneous data rate of each of the wireless devices or the relative data rates among the wireless devices.

4. The method according to claim 3, wherein the data rate criterion is proportional fair in relation to the instantaneous data rate of each of the wireless devices or the relative data rates among the wireless devices.

5. The method according to claim 3, wherein the instantaneous data rate of each of the wireless devices or relative data rates among the wireless device are estimated based on one or more of:
   Reference Signal Received Power (RSRP) measurements; Signal-to-Noise ratio (SNR) measurements; and
   Channel norm measurements.

6. The method according to claim 1, wherein jointly scheduling comprises determining which ones of the wireless devices in the pre-scheduled subset to schedule on the same resource block, based on Channel State Information (CSI) for each wireless device.

7. The method according to claim 1, wherein jointly scheduling comprises performing proportional fair-based (PF-based) Space Division Multiple Access (SDMA) scheduling.

8. The method according to claim 1, wherein jointly scheduling comprises calculating pre-coder vectors.

9. The method according to claim 1, wherein jointly scheduling is performed on different orthogonal resources, and wherein the CoMP transmissions or CoMP receptions are coordinated using pre-coder vectors determined in the scheduling.

10. The method according to claim 1, wherein grouping the wireless devices in the candidate set comprises grouping the wireless devices into fixed groups, based on the cell associations of the wireless devices in the candidate set with respect to the individual cells comprising the CoMP cell.

11. The method according to claim 1, wherein grouping the wireless devices in the candidate set comprises grouping the wireless devices into dynamic groups of wireless devices, based on radio signal measurements.

12. The method according to claim 11, wherein the dynamic groups of wireless devices are determined by using a k-means algorithm based on Reference Signal Received Power (RSRP) measurements, or by using the minimum sum of the squared differences in RSRP measurements.

13. The method according to claim 1, wherein the grouping step is performed continually according to a Channel State Information (CSI) reporting configuration, and wherein the ranking and selecting steps are performed for each scheduling instance or Transmission Time Interval (TTI).

14. The method of claim 1, wherein selecting the one or more wireless devices from each group for inclusion in the pre-scheduled subset comprises limiting a total number of the wireless devices selected for inclusion in the pre-scheduled subset set according to a defined maximum number.

15. The method of claim 1, further comprising determining the number of wireless devices to select from each group for inclusion in the pre-scheduled subset based at least in part on a current load associated with the group.

16. The method of claim 1, further comprising determining the number of wireless devices to select from each group for inclusion in the pre-scheduled subset based at least in part on the number of wireless devices in the group.

17. The method of claim 1, further comprising, for any given wireless device that was included in the pre-scheduled subset but not scheduled in the given scheduling instance, retaining the given wireless device in the pre-scheduled subset for consideration in one or more subsequent scheduling instances, until the given wireless device is scheduled, or until the grouping or ranking steps are redone.

18. A network node configured for operation in a wireless telecommunication network, the network node comprising processing circuitry executing program instructions in a non-transitory computer readable medium, configured to:
- jointly schedule, with respect to recurring scheduling instances, Coordinated Multi-Point (CoMP) transmissions to or receptions from respective wireless devices in a candidate set of wireless devices operating in a CoMP cell comprising two or more individual cells of the network, including limiting a scheduling complexity in each scheduling instance by considering in a scheduling algorithm only a pre-scheduled subset from the candidate set; and
- wherein, to determine the pre-scheduled subset, the processing circuitry is further configured to:
  - group the wireless devices comprising the candidate set into two or more groups, so that wireless devices from the same group are known or estimated to have high mutual spatial correlation, and so that wireless devices from different groups are known or estimated to have low mutual spatial correlation;
  - rank the wireless devices in the groups according to a data rate criterion for each wireless device, reflecting a likelihood of the wireless device being scheduled by the scheduling algorithm; and
  - select one or more wireless devices from each group for inclusion in the pre-scheduled subset, based on the rankings.

19. A non-transitory computer-readable medium storing a computer program comprising program instructions that, when executed by processing circuitry of a network node configured for operation in a wireless telecommunication network, configures the network node to:
- jointly schedule, with respect to recurring scheduling instances, Coordinated Multi-Point (CoMP) transmissions to or receptions from respective wireless devices in a candidate set of wireless devices operating in a CoMP cell comprising two or more individual cells of the network, including limiting a scheduling complexity in each scheduling instance by considering in a scheduling algorithm only a pre-scheduled subset from the candidate set; and
- wherein, to determine the pre-scheduled subset, the computer program further comprises program instructions configuring the processing circuitry to:
  - group the wireless devices comprising the candidate set into two or more groups, so that wireless devices from the same group are known or estimated to have high mutual spatial correlation, and so that wireless devices from different groups are known or estimated to have low mutual spatial correlation;
  - rank the wireless devices in the groups according to a data rate criterion for each wireless device, reflecting a likelihood of the wireless device being scheduled by the scheduling algorithm; and
  - select one or more wireless devices from each group for inclusion in the pre-scheduled subset, based on the rankings.

* * * * *